Sept. 9, 1969  J. A. HAMBLY  3,466,142
METHOD OF PREPARING SPHERICAL ALUMINA HYDRATE
FROM SEEDED ALUMINATE LIQUOR
Filed April 11, 1967  2 Sheets-Sheet 1

INVENTOR.
JAMES ARTHUR HAMBLY
BY Michael Enfiney
ATTORNEY

Sept. 9, 1969  J. A. HAMBLY  3,466,142
METHOD OF PREPARING SPHERICAL ALUMINA HYDRATE
FROM SEEDED ALUMINATE LIQUOR
Filed April 11, 1967  2 Sheets-Sheet 2

INVENTOR.
JAMES ARTHUR HAMBLY
BY
ATTORNEY

United States Patent Office 3,466,142
Patented Sept. 9, 1969

3,466,142
METHOD OF PREPARING SPHERICAL ALUMINA HYDRATE FROM SEEDED ALUMINATE LIQUOR
John Arthur Hambly, Arvida, Quebec, Canada, assignor to Aluminium Laboratories Limited, Montreal, Quebec, Canada, a corporation of Canada
Filed Apr. 11, 1967, Ser. No. 630,122
Int. Cl. C01f 7/34, 7/02; B01d 9/02
U.S. Cl. 23—143        4 Claims

ABSTRACT OF THE DISCLOSURE

Alumina hydrate spheres or spheroids characterized by a naturally smooth external surface and a radially oriented crystal structure.

The spheres are made by forming a loose bed of individual alumina hydrate particles in a pool of supersaturated aluminate liquor and maintaining the particles in random rubbing contact by controlled motion of the bed until spheres in excess of 150 microns are formed.

Calcined spheres are useful as activated aluminas or catalyst supports.

BACKGROUND OF THE INVENTION

This invention relates to alumina hydrate spheres having a radially oriented crystal structure and to a controlled crystallization process for making these spheres.

Commercial manufacture of pure alumina hydrate by crystallization from supersaturated caustic sodium aluminate solutions on a suspension of seed crystals was started by Henri St. Claire Deville in Paris, France, in 1855. St. Claire Deville obtained simultaneous supersaturation and seed crystal formulation by carbonation of the caustic liquor with carbon dioxide. At a later date, previously formed crystals were returned to the starting liquor. In 1888, K. J. Bayer obtained supersaturation by cooling hot undersaturated liquors, and adding seed crystals to obtain crystallization.

Over the last 100 years, the various arts and techniques, limitations and modifications to the liquor and seed circuits have been developed. However, all known methods used in the basic crystallization process are based on using an alumina hydrate seed held in free suspension by either mechanical, hydraulic (eductor) or pneumatic (air lift) devices.

Alumina hydrate obtained by conventional Bayer precipitation (i.e., precipitation from an alkaline solution, in crystalline form, by using aluminum hydroxide crystals as seed) is as a rule a fine powder, its largest particles being usually in the order of 149 microns (100 mesh U.S.), and most of the material around or below 74 microns (200 mesh U.S.). In metallurgical practice we call an alumina coarse when it contains more of the 100 to 200 mesh fraction, and fine when it is more towards the 325 mesh (44 micron) side. The largest particles are in the order of 297 microns (50 mesh U.S.); however, these are very rare.

The product of conventional Bayer precipitation has also as a rule a very wide particle size distribution spectrum, containing particles of all possible sizes from a few microns up to the maximum range; characteristically, even after a very extended holding in contact with the mother liquor the product will contain both very fine and relatively coarse particles, although their relative proportions may vary.

Commercial Bayer Process alumina hydrate product has a typical screen analysis as shown below. It is noteworthy that the sample used for the analysis was taken during the final filtration step; this classification had removed from the alumina hydrate, as produced, a substantial part of the finer fractions.

| Conventional Bayer plant product: | Wt. percent |
|---|---|
| Less than 33µ (microns) | 1 |
| 33–44µ (33µ–325 mesh) | 3 |
| 44–74µ (200–325 mesh) | 36 |
| 74–105µ (150–200 mesh) | 44 |
| 105–149µ (100–150 mesh) | 11 |
| 149–297µ (50–100 mesh) | 5 |

The wide sweep of particle sizes and the distribution of the major portions over more than one size range is a typical feature of the Bayer Process. Also the presence of some very small particles in the product is typical.

SUMMARY

An object of this invention is a process of making alumina hydrate particles of a size substantially larger than about 150 microns and desirably larger than about 300 microns.

Another object of the invention is a process of making alumina hydrate particles of substantially a single size range, i.e., substantially all of the product particles fall within a single sieve mesh size such as 14–15 U.S. mesh.

A special object of this invention is a process which attains the above two objects simultaneously.

Other objects of the invention will become apparent in the course of the detailed description of the invention.

It has been discovered the above and other objects are attained by a process comprising: seeding supersaturated aluminate liquor with alumina hydrate fines; forming, from said seeded liquor, a loose bed of individual, contiguous alumina hydrate particles, which particles are in contact (immersed in) with a pool of supersaturated aluminate liquor; maintaining said bed in controlled motion affording random rubbing contact between adjacent individual particles, while simultaneously contacting said particles with said pool of liquor, which contacting produces individual spheres of alumina hydrate; said motion and said contacting with the pool liquor is continued until individual spheres having a diameter in excess of 150 microns have been produced. Desirably the operation is continued until the individual spheres have a diameter in excess of about 300 microns; spheres having a diameter predominantly in excess of about 1,000 microns can be produced.

Surprisingly, the process of the invention makes alumina spheres characterized by a naturally smooth external surface and a radially oriented crystal structure and an apparent density greater than that of Bayer Process particles; these spheres have a diameter in excess of 150 microns, desirably in excess of about 300 microns, and can be made in sizes having a diameter in excess of 1,000 microns.

DESCRIPTION AND WORKING EXAMPLES

Figure 1:
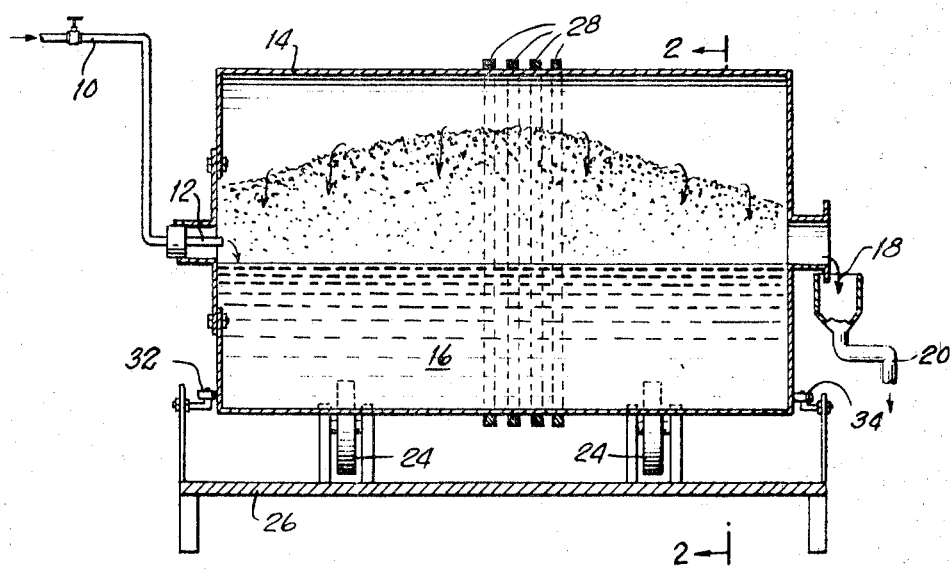
FIG. 1 shows a partial side view of a rotary drum unit used in test work on the process.

The process of the invention will operate on aluminate liquor, pretty much, regardless of source. However, a preferred source is Bayer Process pregnant liquor.

The aluminate liquor may be in the supersaturated state before it is introduced into the process or it may be placed in the supersaturated state after it is introduced into the process, e.g., by lowering the temperature of the liquor.

In the initiation of the process, a pool of supersaturated aluminate liquor is seeded with alumina hydrate fines, e.g., particles less than 325 Tyler mesh, although larger particles may be used.

The seeded pool of liquor is controlled to form a loose bed of individual, contiguous alumina hydrate particles within a pool of supersaturated aluminate liquor. The pool may be maintained in the supersaturated state by cooling—in a batch operation—or by withdrawal of a portion of the pool liquor and addition of saturated liquor—at more or less constant temperature or temperature drop—in a continuous process.

The loose bed (dense bed) within the pool is maintained in motion (agitated) affording random rubbing contact between adjacent individual particles. Simultaneously the moving individual particles are contacted by the pool liquor, which provides alumina for particle growth. It is thought the random rubbing of adjacent particles *causes* the particles to assume and to grow in a spherical shape. Thus in this type of agitator, the loose bed crystallizer to impart the motion of the bed, rubbing of particles against the drum wall will aid in imparting the sperical shape. Thus in this type of agitator, the loose bed may be substantially a single layer of particles immediately adjacent the lower wall of the drum.

The loose bed of particles and the pool of supersaturated liquor are maintained in controlled motion (agitation) until indivdual spheres having a diameter in excess of 150 microns, of the desired diameter, have been produced.

It has been observed that the final product is substantially of a single size range, as measured by sieve size or by micron size classification range. The substantially one-size product is obtained over the diameter size range of 300 microns to at least 7,000 microns (¼ inch).

By using two or more drums in series, one can produce continuously and simultaneously two or more different size fractions. In a long drum, the product in any given section along the axis of the drum will be quite uniform with regard to size. Two or more sizes can be obtained in such a drum divided into compartments by means of internal baffles. The different fractions produced can be removed intermittently by using electrically or pneumatically activated valves on the cylindrical wall of the drum.

The motion of the loose bed must be mild enough to reduce grinding action to less than the particle growth rate and still must be active enough so the particles will not cage (bind) together. On the other hand, the motion must maintain a loose bed (dense bed) condition wherein the bed while being agitated occupies substantially the same volume as does the bed at rest—in other words, the individual particles are not in a state of free suspension or even a substantially expanded bed while in motion.

It has been found that especially good results are obtained using a rotary drum having no longitudinal internal baffling and "smooth" interior walls as the container for the pool and loose bed and the source of motion of the bed. Such a drum gives satisfactory results at a peripheral speed of about 45 feet per hour; of course, the drum speed may vary dependent on conditions of temperature, liquor, particle size and continuous or batch operation. When using this type of drum, continuous flow of liquor into and out of the interior of the drum is preferred, as each unit volume of liquor contains only a limited amount of alumina hydrate available for particle growth.

Other procedures may be used to provide the proper motion of the loose bed of particles. Illustrative other procedures are:

A drum or trough oscillating around its longitudinal axis, i.e., a container giving a pendulum-like motion to the material. A drum or trough with an axial oscillating movement similar to that of conventional oscillating conveyors used for handling solids. A crystallizer in the form of a trough or cylinder with an internal conveying arrangement such as a screw or ribbon, and set to operate at very low r.p.m.'s—something in the order of 2–6 r.p.h. A vessel or column, containing a coarse fluid bed with the liquor flowing vertically in the upward direction through it.

The calcination of the alumina hydrate spheres is relatively easy as the material is quite resistant to thermal shock and does not decrepitate. The properties of the alumina depend, as usual, on the final temperature of calcination. The aluminas obtained at lower temperatures can be used as activated alumina, catalyst supports etc. At higher tempertures, there are obtained products of interest to ceramic manufacturers, for sintering into porous bodies; vary highly calcined material could be used as a filtering medium for highly corrosive liquids and gases such as aqueous or wet gaseous HF, for sintering and for fusion.

EXAMPLES

The process of the invention, and the product alumina hydrate spheres, are illustrated by the following examples.

The illustrative work was carried out in a continuous manner with Bayer plant pregnant liquor charged continuously, during each test, by way of valved feed line 10 (see FIG. 1), provided with liquor inlet 12, on the cylindrical axis of drum 14. Drum 14 was 50 inches long and 30 inches in diameter. Liquor from pool 16 within drum 14 overflowed out of the drum through axial overflow port at 18 and was discharged by way of unit 20.

The drum 14 rested on pairs of trunnions 22 and 24 which were mounted on base plate 26. A 4-V belt drive 28 was driven by a motor attached to drive pulley 30. Drive 28 is not shown completely in FIG. 1. End-thrust rollers 32 and 34 were provided. Drum 14 was free of internal baffling and had a smooth steel interior surface.

Figure 2:
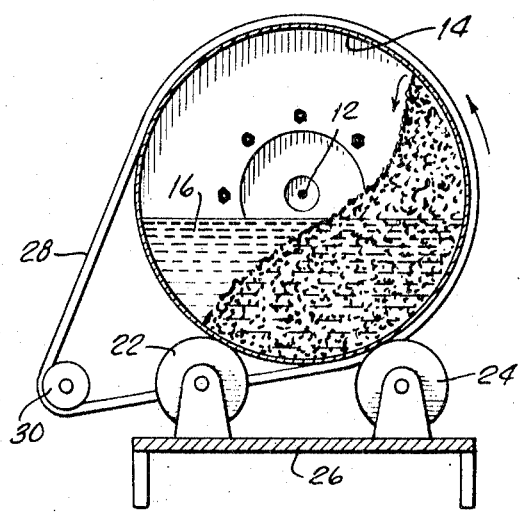
FIG. 2 shows a cross-sectional end view through FIG. 1 at plane 2—2.

In this arrangement the depth of the pool was about 12 inches. In FIG. 2 there is shown a somewhat idealized shape of the loose bed (usually spoken of as a rolling bed when using this rotary drum to provide the motion) within the drum while the drum was being rotated.

Several tests demonstrated that six revolutions per hour of the drum, corresponding to a peripheral speed of 45 feet per hour, gave excellent results and the data reported herein were obtained at this speed.

The liquor pool was fed with a continuous stream of Bayer plant pregnant liquor (filtrate liquor) at approximately 200 degrees F., and containing on an average 100 g.p.l. $Al_2O_3$ and 160 g.p.l. NaOH as $Na_2CO_3$ equivalent ($Al_2O_3$/NaOH ratio 0.625).

The temperature of the liquor pool was dependent on natural cooling by radiation, and was adjusted over a temperature of 160 degrees F. to 190 degrees F. by adjusting the flow rate. Essentially the operation consisted of alumina hydrate in a liquor pool of constant quality. Neither the weight of the seed bed or the liquor flow was measured. Hydrate growth rates were determined by the particle size increase over days crystallization time for specific temperatures.

It was necessary to remove the production growth from the bed. The removal rate decreased directly as the decrease in the crystallization surface of the bed.

The concentrations and temperatures used in this process are essentially similar to those in the conventional Bayer process and any departure from them may cause difficulties such as the formation of excessive fines, etc.

The rate of particle diameter increase for constant liquor qualities and temperatures was linear from minus 200 mesh to an 8 mesh screen size over a 15-week operating period. The production rate is thus dependent on the total surface of the particles, decreasing as the particles increase in diameter. The number of particles per unit volume is also dependent on the size distribution and packing. The total production is a function of the bed volume, seed surface, liquor quality and temperature. Particles in different size ranges may be grown in the same seed bed without interference with the growth rates.

The observed growth rate of alumina hydrate spheres as determined by the sieve openings in microns of screens used in the analysis is set out below:

| Days in the loose bed: | Microns |
|---|---|
| 3 | 100 |
| 7 | 200 |
| 18 | 400 |
| 30 | 750 |
| 40 | 1000 |
| 60 | 1400 |
| 90 | 2000 |
| 105 | 2400 |

The alumina trihydrate produced by this process is generally, free of particles smaller than the starting seed; in practice, the smallest particles are in the order of 74 microns, and grow up to 4760 microns (4 mesh, Tyler). Particles as large as 6680 microns (¼ inch screen) have been already produced by this process. In contrast to alumina trihydrate produced by the prior art processes the size distribution of this product is very narrow.

A large grab sample (82.8 lbs.) was taken from the bed in the rotating drum. This was analyzed for size with the following results.

| Process product: | Wt. percent |
|---|---|
| Less than 74μ (200 mesh) | 0.003 |
| 74–105μ (150–200 mesh) | 0.002 |
| 105–149μ (100–150 mesh) | 0.002 |
| 149–208μ (65–100 mesh) | 0.004 |
| 208–417μ (35–65 mesh) | 0.060 |
| 417–589μ (28–35 mesh) | 0.100 |
| 589–840μ (20–28 mesh) | 1.4 |
| 840–1190μ (16–20 mesh) | 3.5 |
| 1190–1410μ (14–16 mesh) | 94.6 |

It is worth repeating that 94.6% of this sample fell in the single sieve size range of "through 14, retained on 16." This is astounding in relation to prior work on alumina hydrate processing.

Another characteristic feature of the alumina-hydrate product of this invention is its almost perfectly spherical shape. It has a more pronounced radial structure than the ordinary Bayer plant product, is somewhat denser and noticeably stronger. The external surface of the granule is round and smooth, while in conventional hydrate it has a characteristic cauliflower-like surface pattern, reflecting its inner radial structure.

A single sphere of an "on 8" mesh Tyler screen size was cut and viewed under the miscroscope.

Figure 3:
FIG. 3 shows a 30× photomicrograph of an "8 mesh" aluminate hydrate sphere thin section.
Figure 4:
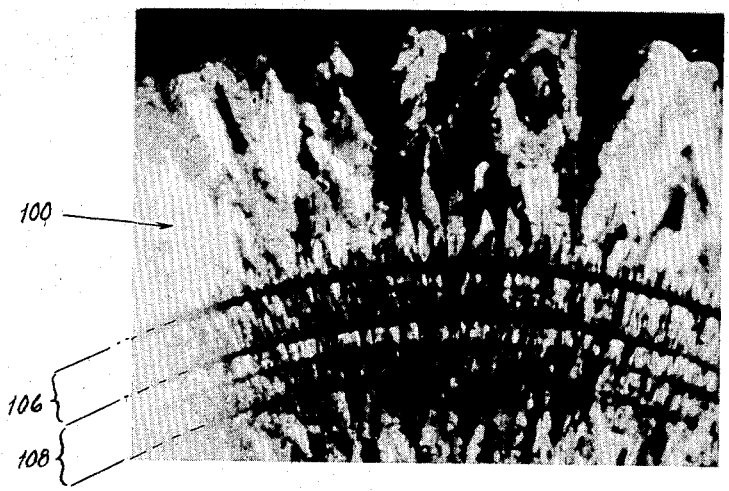
FIG. 4 shows a 120× photomicrograph of a portion of FIG. 3.

FIG. 3 at a magnification of 30× shows a number of growth rings 100, 102, and 104. These rings correspond to periods when rotation of the bed had been stopped. FIG. 4 shows a section of the sphere of FIG. 3. Additional growth rings 106 and 108 are evident within 102 in the photomicrograph. The radial orientation of the crystal structure of the sphere is very apparent; the monocrystals forming the sphere are large and well formed.

Other observations were made during the test work. Some of these are:

Initial turbidity from nucleation can be swept out of the pool and bed by increasing the liquor flow rate.

If the cylinder stops rotating over three hours with a pregnant liquor pool the bed will cake. There is a greater tendency to cake as the particles become larger. It is necessary to exhaust or replace the pregnant liquor with spent liquor to avoid caking in case of a long shutdown.

It is possible to operate a rolling bed for a long period before it is necessary to shut down for scale removal. The hydrate scale deposits slowly as a dense coherent layer at the same rate as the particle growth. It is a different material from the usual Bayer Process precipitator scale which is largely a conglomerate of hydrate particles cemented together.

If precipitator scale is added to the seed bed it becomes coated with a dense layer of alumina hydrate over the soft center. The soda in the conglomerate scale cannot be leached without crushing to expose the core.

The producing capacity of the drum varies in an inverse proportion of the size of the product made, i.e., the coarser the material the lesser the productive capacity and the longer the residence time required.

Thus having described the invention, what is claimed is:

1. A process for making alumina hydrate spheres, which process comprises:
   (a) seeding supersaturated aluminate liquor with alumina hydrate fines;
   (b) forming, from said seeded liquor, a loose bed of individual, contiguous alumina hydrate particles in contact with a pool of supersaturated aluminate liquor;
   (c) maintaining said bed in controlled motion affording random rubbing contact between adjacent individual particles and simultaneous contacting of said particles and said pool, thereby producing individual spheres of alumina hydrate; and
   (d) continuing said motion and said liquor contacting until individual spheres having a diameter in excess of 150 microns have been produced.

2. The process of claim 1 wherein said liquor is Bayer process pregnant liquor.

3. The process of claim 1 wherein said product spheres have a diameter predominantly in excess of about 1000 microns.

4. The process of claim 1 wherein said motion is provided by the movement of a drum, without longitudinal internal baffles, slowly rotating about its cylindrical axis, said bed being positioned within said drum.

References Cited

UNITED STATES PATENTS

| | | | |
|---|---|---|---|
| 2,352,867 | 7/1944 | Stowe | 23—141 |
| 2,584,286 | 2/1952 | Pierce et al. | 23—141 |
| 3,177,151 | 4/1965 | Calvert | 252—448 X |
| 3,231,520 | 1/1966 | Leak et al. | 252—463 |
| 3,264,069 | 8/1966 | Getty | 23—143 X |
| 3,304,154 | 2/1967 | Kiouzes-Pezas | 23—66 |
| 3,353,910 | 11/1967 | Cornelius et al. | 23—141 |
| 3,377,134 | 4/1968 | Baker et al. | 23—110 |

OSCAR R. VERTIZ, Primary Examiner

G. T. OZAKI, Assistant Examiner

U.S. Cl. X.R.

23—141, 301, 305, 252—448, 463

FO-1050
(5/69)

UNITED STATES PATENT OFFICE
CERTIFICATE OF CORRECTION

Patent No. 3,466,142      Dated Sept. 9, 1969

Inventor(s) John Arthur Hambly

It is certified that error appears in the above-identified patent and that said Letters Patent are hereby corrected as shown below:

Column 2, line 24, for "14-15" read --14-16--. Column 3, line 22, "Thus in this type of agitator, the loose bed" should read --When using a rotary drum, or the like--; line 49, for "cage" read --cake--. Column 4, line 14, for "vary" read --very--. Column 6, line 15, for "of" [first occurrence] read --to--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents